United States Patent Office 3,496,162
Patented Feb. 17, 1970

3,496,162
DISAZO DYESTUFFS CONTAINING N-(CYANO-ETHYL)-SULPHONAMIDE GROUPS HAVING LOW SOLUBILITY IN WATER
Wolfgang Groebke, Oberwil, Basel-Land, Curt Mueller, Basel, and Roswitha Wirz, Liestal, Switzerland, assignors to Sandoz Ltd. (also known as Sandoz A.G.), Basel, Switzerland
No Drawing. Filed Dec. 9, 1966, Ser. No. 600,405
Claims priority, application Switzerland, Dec. 16, 1965, 17,397/65
Int. Cl. C09b 33/04; D06p 1/04
U.S. Cl. 260—187                      8 Claims

ABSTRACT OF THE DISCLOSURE

Disazo dyes of low water solubility, having in their molecular structure either a cyanoalkylaminocarbonyl- or a cyanoalkylaminosulfonyl-group bound to an aromatic nucleus, yield dyeings on linear aromatic polyester, secondary cellulose acetate, cellulose triacetate, polyamide, polyacrylonitrile and polyvinyl fibers of excellent thermofixation, sublimation, pleating, gas fumes and washing fastness.

---

This invention relates to new disazo dyes of low solubility in water, which have the formula

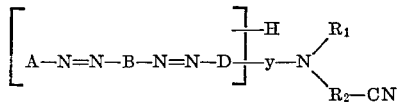

where:
A stands for the radical of a diazo component of the benzene, naphthalene or heterocyclic series,
B for a phenylene or naphthylene radical which may be substituted by lower alkyl, alkoxy or alkylmercapto groups,
D for a benzene radical which bears a hydroxyl group in ortho- or para-position to the azo group and may bear further substituents, such as chlorine or bromine atoms or lower alkyl or alkoxy groups,
$R_1$ for a hydrogen atom or a lower alkyl radical, which latter may be substituted by a cyano group,
$R_2$ for a lower alkylene radical, preferably the ethylene radical, and
y for the radical —CO— or —SO₂—, and in which all the radicals are free from carboxylic and sulphonic acid groups.

The process for their production consists in coupling the diazo compound of an aminoazo dye free from acid water-solubilizing groups and of the formula

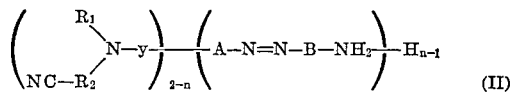

with a compound of formula

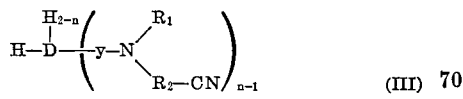

In Formulae II and III n may represent 1 or 2, but in either case its meaning is identical in both formulae.
Very valuable dyes are of the formula

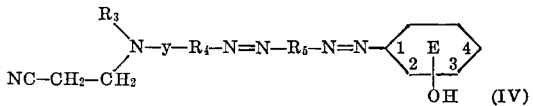

wherein:
$R_3$ stands for a hydrogen atom or an unsubstituted or cyano-substituted lower alkyl group,
$R_4$ for a phenylene or naphthylene radical which may be substituted by chlorine or bromine atom, nitro, cyano, or lower alkyl or alkoxy groups,
$R_5$ for a phenylene or naphthylene radical which may be substituted by lower alkyl, alkylmercapto and/or alkoxy groups and
y for the radical —CO— or —SO₂—, and where the —OH group in the nucleus E, which nucleus may be further substituted by lower alkyl or alkoxy groups, is in 2- or 4-position.
They are obtained by coupling a diazotised aminoazo compound of formula

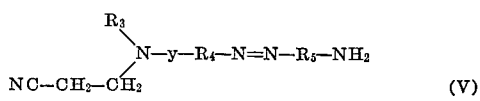

with a hydroxybenzene which may be substituted by a lower alkyl or alkoxy group.
Especially preferred dyes are of the formula

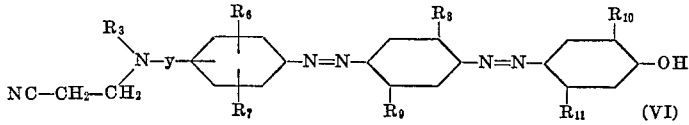

wherein:
$R_3$ represents a hydrogen atom or an unsubstituted or cyano-substituted lower alkyl group,
$R_6$ and $R_{10}$, independently of each other, represent a hydrogen, chlorine or bromine atom or a lower alkyl or alkoxy group,
$R_7$ a hydrogen, chlorine or bromine atom, a cyano, nitro or lower alkyl or alkoxy group,
$R_8$ and $R_9$, independently of each other represent a hydrogen atom or a lower alkyl, alkoxy or alkylmercapto group and
$R_{11}$ a hydrogen atom or a lower alkyl or alkoxy group.

These dyes are formed by coupling a diazotised amino-azo compound of formula

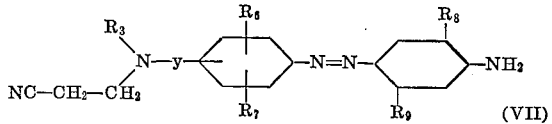

with a compound of formula

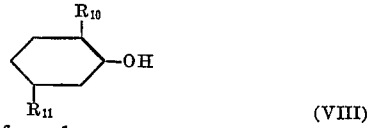

Excellent dyes of formula

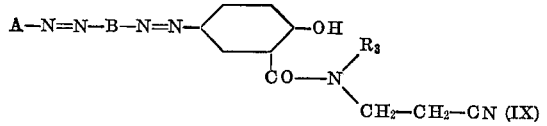

in which the symbols A, B and $R_3$ have one of the meanings assigned to them in the foregoing, are obtained by coupling a diazotised amine of formula $$A\!-\!N\!\!=\!\!N\!-\!B\!-\!NH_2 \qquad (X)$$

with a compound of formula

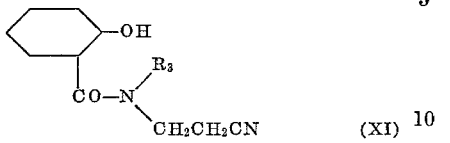

$$(XI)$$

Under "lower" alkyl, alkylmercapto or alkoxy groups or alkylene radicals are understood those having 1, 2, 3 or 4 carbon atoms.

The azo compounds of Formula VII can be obtained by coupling a diazotised amine of formula

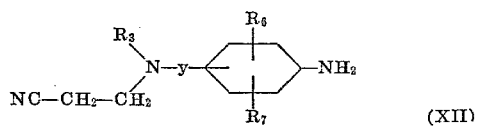

$$(XII)$$

with an amino compound of formula

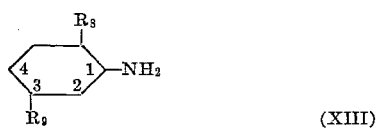

$$(XIII)$$

which couples in the 4-position.

The compounds of Formula XII in which $y$ denotes the radical —CO— can be produced by the known methods, for example by reacting an amine of formula

$$(XIV)$$

with a suitable chloride of nitrobenzenecarboxylic acid, with subsequent reduction of the nitro group.

Diazo components of Formula XII in which $y$ stands for —SO$_2$— can likewise be produced by known methods, for example from compounds of formula

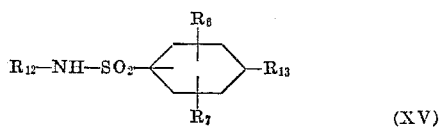

$$(XV)$$

where:

$R_{12}$ represents hydrogen or lower alkyl and
$R_{13}$ the amino or acetylamino group, by cyanoethylation and if necessary, subsequent saponification of the acetylamino group.

The synthesis of diazo components of formula

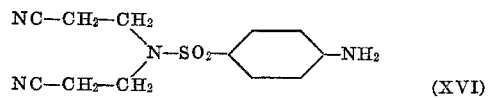

$$(XVI)$$

is described, for example in the Journal Gen. Chem. of the U.S.S.R. 34, 590 (1964), English edition, and is effected by adding on acrylonitrile to sulphanilic acid amide in boiling aqueous-alkaline solution.

Examples of diazotisable amines conforming to Formula XII which are suitable for the production of the dyes of this invention are:

1-aminobenzene-4-N,N-bis-(2′-cyanoethyl)-sulphonic acid amide,
1-aminobenzene-2-chloro-4-N,N-bis-(2-cyanoethyl)-sulphonic acid amide,
1-aminobenzene-2-methyl-4-N,N-bis-(2′-cyanoethyl)-sulphonic acid amide,
1-aminobenzene-2-methoxy-4-N,N-bis-(2′-cyanoethyl)-sulphonic acid amide,
1-aminobenzene-2,5-dichloro-4-N,N-bis-(2′-cyanoethyl)-sulphonic acid amide,
1-aminobenzene-2-chloro-6-methyl-4-N,N-bis-(2′-cyanoethyl)-sulphonic acid amide,
1-aminobenzene-3-N,N-bis-(2′-cyanoethyl)-sulphonic acid amide,
1-aminobenzene-4-chloro-3-N,N-bis-(2′-cyanoethyl)-sulphonic acid amide,
1-aminobenzene-4-methoxy-3-N,N-bis-(2′-cyanoethyl)-sulphonic acid amide,
1-aminobenzene-4-cyano-3-N,N-bis-(2′-cyanoethyl)-sulphonic acid amide,
1-aminobenzene-4-nitro-6-chloro-3-N,N-bis-(2′-cyanoethyl)-sulphonic acid amide,
1-aminobenzene-4-(N-methyl-N-2′-cyanoethyl)-sulphonic acid amide,
1-aminobenzene-2-methyl-4-(N-methyl-N-2′-cyanoethyl)-sulphonic acid amide,
1-aminobenzene-2,5-dimethyl-4-(N-methyl-N-2′-cyanoethyl)-sulphonic acid amide,
1-aminobenzene-2-nitro-4-(N-methyl-N-2′-cyanoethyl)-sulphonic acid amide,
1-aminobenzene-2,5-dichloro-4-(N-methyl-N-2′-cyanoethyl)-sulphonic acid amide,
1-aminobenzene-2,6-dichloro-4-(N-methyl-N-2′-cyanoethyl)-sulphonic acid amide,
1-aminobenzene-3-(N-methyl-N-2′-cyanoethyl)-sulphonic acid amide,
1-aminobenzene-4-methyl-3-(N-methyl-N-2′-cyanoethyl)-sulphonic acid amide,
1-aminobenzene-6-chloro-3-(N-methyl-N-2′-cyanoethyl)-sulphonic acid amide,
1-aminobenzene-4-nitro-6-methyl-3-(N-methyl-N-2′-cyanoethyl)-sulphonic acid amide,
1-aminobenzene-4-N-(2′-cyanoethyl)-sulphonic acid amide,
1-aminobenzene-4-(N-ethyl-N-2′-cyanoethyl)sulphonic acid amide,
1-aminobenzene-4-(N-butyl-N-2′-cyanoethyl)-sulphonic acid amide,
1-aminobenzene-4-N,N-bis(2′-cyanoethyl)-carboxylic acid amide,
1-aminobenzene-2-chloro-4-N,N-bis-(2′-cyanoethyl)-carboxylic acid amide,
1-aminobenzene-2-cyano-4-N,N-bis-(2′-cyanoethyl)-carboxylic acid amide,
1-aminobenzene-2-nitro-4-N,N-bis-(2′-cyanoethyl)-carboxylic acid amide,
1-aminobenzene-2,5-dicyano-4-N,N-bis-(2′-cyanoethyl)-carboxylic acid amide,
1-aminobenzene-4-(N-methyl-N-2′-cyanoethyl)-carboxylic acid amide,
1-aminobenzene-2-chloro-4-(N-methyl-N-2′-cyanoethyl)-carboxylic acid amide,
1-aminobenzene-2,5-dichloro-4-(N-methyl-N-2′-cyanoethyl)-carboxylic acid amide,
1-aminobenzene-2,6-dichloro-4-(N-methyl-N-2′-cyanoethyl)-carboxylic acid amide,
1-aminobenzene-4-N-(2′-cyanoethyl)-carboxylic acid amide,
1-aminobenzene-4-(N-ethyl-N-2′-cyanoethyl)-carboxylic acid amide,
1-aminobenzene-4-(N-propyl-N-2′-cyanoethyl)-carboxylic acid amide,
1-aminobenzene-3-N-(2′-cyanoethyl)-carboxylic acid amide,
1-aminobenzene-3-(N-methyl-N-2′-cyanoethyl)-carboxylic acid amide and
1-aminobenzene-6-methyl-3-(N-methyl-N-2′-cyanoethyl)-boxylic acid amide.

Examples of amines of Formula XIII which are suitable as middle components are:

1-aminobenzene,
1-amino-2-methylbenzene,
1-amino-2-methoxybenzene,
1-amino-3-methylbenzene, 1-amino-3-methoxybenzene,
1-amino-2,5-dimethylbenzene,
1-amino-2,6-dimethylbenzene,
1-amino-2-methoxy-5-methylbenzene,
1-amino-2,5-dimethoxybenzene and
1-amino-2,5-diethoxybenzene.

As coupling components (end components) of Formula VIII the following are suitable:

hydroxybenzene,
2-methyl-1-hydroxybenzene,
2-methoxy-1-hydroxybenzene,
3-methyl-1-hydroxybenzene,
3-methoxy-1-hydroxybenzene,
4-methyl-1-hydroxybenzene,
4-methoxy-1-hydroxybenzene,
2-chloro-1-hydroxybenzene,
1-hydroxybenzene-2-(N-methyl-N-2′-cyanoethyl)-carboxylic acid amide,
1-hydroxybenzene-2-N,N-bis-(2′-cyanoethyl)-carboxylic acid amide and
1-hydroxybenzene-2-(N-ethyl-N-2′-cyanoethyl)-carboxylic acid amide.

The coupling reaction with amino compounds is carried out advantageously in a weakly acid medium and the coupling reaction with the phenolic end components in weakly alkaline medium with cooling, for example at temperature of 0° to 5° C.

It is of special advantage to convert the new dyes thus obtained into dyeing preparations before use. For this purpose they are ground or milled to an average particle size of about 0.01 to 10 microns or more particularly 0.1 to 5 microns. They can be ground in the presence of dispersants of fillers. For example, the dried dye can be ground with a dispersant and if necessary fillers, or kneaded in paste form with a dispersant and subsequently vacuum dried. After the addition of an appropriate volume of water, these preparations can be used for dyeing, padding or printing from long or short baths. For dyeing from long bath, amounts of up to 10 grams dye per litre are generally used; for padding, up to about 150 grams or, preferably, 0.1 to 100 grams per litre; and for printing, up to about 150 grams per 1000 grams of printing paste. The liquor ratio may vary within wide limits, for example from 1:3 to 1:200 or, preferably, 1:3 to 1:80.

From aqueous dispersion the dyes build up excellently on shaped materials of fully synthetic or semi-synthetic organic high-molecular substances. They are specially suitable for dyeing, pad dyeing and printing filaments, fibres, woven fabrics and knit goods of linear aromatic polyester, secondary cellulose acetate and cellulose triacetate. They can also be dyed on synthetic polyamides, acrylonitrile polymers and polyvinyl compounds. Very valuable dyeings are obtained on linear aromatic polyesters, which are generally the polycondensation products of terephthalic acid and glycols, in particular ethylene glycol.

The known dyeing methods are used. Polyester fibres can be exhaustion dyed at normal or excess pressure in the presence of carriers in the temperature range of about 80° to 125° C. or in the absence of carriers at about 100° to 140° C. These fibres can also be padded or printed with aqueous dispersions of the new dyes and the paddings or prints fixed at about 140° to 230° C., for example with the aid of water vapour or air. In the optimum temperature range of 180° to 220° C. the dyes diffuse rapidly into polyester fibre and do not sublime from the fibre, even when exposed to these high temperatures for some length of time. This precludes inconvenient contamination of the dyeing and fixing equipment. Secondary cellulose acetate is dyed preferably at about 65° to 85° C. and cellulose triacetate at temperatures up to about 115° C. The optimum pH range is 2 to 9 or more particularly 4 to 8.

In most cases the normal dispersants or a mixture of dispersants are used, preferably those of anionic or non-ionic character. About 0.5 gram of dispersant per litre of the dyeing medium is often sufficient, although larger amounts up to about 3 grams per litre can be used. Amounts in excess of 5 grams do not usually offer any further advantage. Known anionic dispersants which can be used for the process are, for example, the condensation products of naphthalenesulphonic acids and formaldehyde, in particular dimethylmethane disulphonates, the esters of sulphonated succinic acid, turkey red oil, the alkaline salts of the sulphuric acid esters of fatty alcohols e.g. sodium lauryl sulphonate or sodium cetyl sulphate, sulphite cellulose waste liquor or its alkaline salts, soaps, and the alkaline sulphonates of the monoglycerides of fatty acids. Examples of known and very suitable non-ionic dispersants are the adducts of about 3–40 moles of ethylene oxide on alkylphenols, fatty alcohols and fatty amides, and their neutral sulphuric acid esters.

In padding and printing the usual thickening agents are used, for example modified or unmodified natural products such as sodium alginates, British gum, gum Arabic, crystal gum, locust bean gum, gum tragacanth, carboxymethyl cellulose, hydroxyethyl cellulose, and starches, or synthetic products such as polyacrylamides or polyvinyl-alcohols.

The dyeings obtained are extremely fast, for instance to thermofixation, sublimation, pleating, gas fumes and washing.

The disazo dyes obtained in accordance with the present process have superior thermofixation fastness to those described in Swiss patent specification 389,312. This excellent behaviour in thermofixation is important in view of the process of shape and dimensional stabilisation for textiles and garments of polyester/cotton, as described in the American Dyestuff Reporter 54, p. 738 (1965). In this process dyed material is treated with a liquor containing a selected synthetic resin, a catalyst and softeners, dried at 80–110° C. to a moisture content of 6–8% and made into garments or other retail goods in this state. The shape and dimensions of the final articles are set by treating it for 10–30 or preferably 15–18 minutes at 140–230° C. or preferably 170–180° C.

In the examples the parts and percentages are by weight and the temperatures are given in degrees centigrade.

EXAMPLE 1

27.8 parts of 1-aminobenzene-4-N,N-bis-(2′-cyanoethyl)-sulphonic acid amide are dissolved at room temperature in a mixture of 100 parts of water and 50 parts of 30% hydrochloric acid. Ice is stirred into the solution and at 0° it is diazotised with a solution of 6.9 parts of sodium nitrite in 20 parts of water. The resulting diazo solution is run at 0–5° into a solution of 10.7 parts of 1-amino-3-methylbenzene in 37 parts of 10% hydrochloric acid and 200 parts of water, after which the coupling reaction is brought to a close by adding 155 parts of a 50% sodium acetate solution. 39.6 parts of the resulting 4-amino - 2 - methyl-1,1′-azobenzene-4′-N,N-bis-(2″-cyano ethyl)-sulphonic acid amide, as obtained in aqueous paste form, are suspended in 200 parts of water, with the subsequent addition of 23 parts of 30% hydrochloric acid. Diazotisation is effected by the addition of a solution of 6.9 parts of sodium nitrite in 20 parts of water. The solution of the diazo compound is added at 0–10° to a solution of 9.4 parts of hydroxybenzene in 10 parts of 30% sodium hydroxide solution, 30 parts of calcined sodium carbonate and 200 parts of water. The powdery orange-brown dye is filtered off and dried. After recrystallisation from n-butanol it melts at 201–203° (uncorrected).

EXAMPLE 2

27.8 parts of 1-aminobenzene-4-N,N-bis-(2′-cyanoethyl)-sulphonic acid amide are diazotised as described in Example 1. The diazo solution is run at 0–5° into a solution of 13.7 parts of 1-amino-2-methoxy-5-methylbenzene in 37 parts of 10% hydrochloric acid and 200 parts of water, and the coupling reaction is completed by the addition of 155 parts of 50% sodium acetate solution. After filtration the 4-amino-5-methoxy-2-methyl-1,1'-azobenzene-4'-bis-(2''-cyanoethyl)-sulphonic acid amide is obtained as an aqueous paste. 42.6 parts of it are suspended in 200 parts of water, 25 parts of 30% hydrochloric acid are added and then a solution of 6.9 parts of sodium nitrite in 20 parts of water is run in for diazotisation. The solution of the diazo compound thus obtained is added at 0–10° to a solution of 9.4 parts of hydroxybenzene, 10 parts of 30% sodium hydroxide solution and 30 parts of calcined sodium carbonate in 200 parts of water. The powdery brown dye is filtered off and dried. On recrystallisation from n-butanol it melts at 193–194° (uncorrected).

EXAMPLE 3

A diazonium salt solution is prepared as given in Example 1 and run at 0–5° into a solution of 12.1 parts of 1-amino-2,5-dimethylbenzene in 37 parts of 10% hydrochloric acid and 200 parts of water. The coupling reaction is completed by the addition of 155 parts of a 50% sodium acetate solution. 41 parts of the 4-amino-2,5-dimethyl - 1,1' - azobenzene - 4' - N,N - bis - (2'' - cyanoethyl)-sulphonic acid amide, which is obtained as an aqueous paste, are suspended in 200 parts of water, and after the addition of 25 parts of 30% hydrochloric acid a solution of 6.9 parts of sodium nitrite in 20 parts of water is added for diazotisation. The resulting diazo compound is added at 0–10° to a solution of 9.4 parts of hydroxybenzene in 10 parts of 30% sodium hydroxide solution, 30 parts of calcined sodium carbonate and 200 parts of water. The powdery brown dye is filtered off and dried. On recrystallisation from n-butanol it melts at 220–222° (uncorrected).

EXAMPLE 4

24.2 parts of 1-aminobenzene-4-N,N-bis-(2'-cyanoethyl)-carboxylic acid amide are dissolved in a solution of 150 parts of water and 35 parts of 30% hydrochloric acid at room temperature. Ice is stirred into the solution and at 0° it is diazotised with a solution of 6.9 parts of sodium nitrite in 20 parts of water. The diazo solution is allowed to flow at 0–5° into a solution of 13.7 parts of 1-amino-2-methoxy-5-methylbenzene in 37 parts of 10% hydrochloric acid and 200 parts of water, the coupling reaction being completed by the addition of 117 parts of 50% sodium acetate solution. After filtration, 39 parts of the resulting 4-amino-5-methoxy-2-methyl-1,1'-azobenzene-4'-N,N-bis-(2''-cyanoethyl)-carboxylic acid amide, which is obtained as an aqueous paste, are suspended in 200 parts of water. 25 parts of 30% hydrochloric acid are added and diazotisation is carried out by the addition of a solution of 6.9 parts of sodium nitrite in 20 parts of water. The diazo compound is added at 0–10° to a solution of 9.4 parts of hydroxybenzene in 10 parts of 30% sodium hydroxide solution, 30 parts of calcined sodium carbonate and 200 parts of water. The powdery brown dye is filtered off and dried. After recrystallisation from n-butanol it melts at 174–176° (uncorrected).

EXAMPLE 5

23.9 parts of 1-aminobenzene-4-(N-methyl-N-2'-cyanoethyl)-sulphonic acid amide are dissolved at room temperature in a mixture of 150 parts of water and 50 parts of 30% hydrochloric acid. Ice is stirred in and at 0° the solution is diazotised with a solution of 6.9 ports of sodium nitrite in 20 parts of water. The diazo solution is run at 0–5° into a solution of 13.7 parts of 1-amino-2-methoxy-5-methylbenzene in 37 parts of 10% hydrochloric acid and 200 parts of water, and the coupling reaction is completed by adding 155 parts of 50% sodium acetate solution. 38.7 parts of the 4-amino-5-methoxy-2 - methyl - 1,1' - azobenzene - 4' - (N - methyl - N'' - 2'-cyanoethyl)-sulphonic acid amide, which is obtained as a moist paste, are suspended in 200 parts of water, to which 25 parts of 30% hydrochloric acid are added, followed by a solution of 6.9 parts of sodium nitrite in 20 parts of water for diazotisation. The solution of the diazo compound is run at 0–10° into a solution of 9.4 parts of hydroxybenzene in 10 parts of 30% sodium hydroxide solution, 30 parts of calcined sodium carbonate and 200 parts of water. The powdery brown dye is filtered off and dried. After recrystallisation from n-butanol it melts at 187–189° (uncorrected).

The following table contains details of further dyes conforming to the present invention, which correspond to the formula

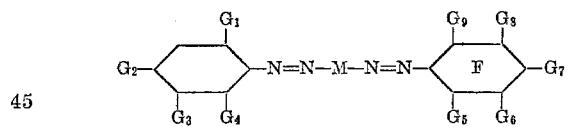

In these dyes the central aryl radical M is invariably bound in 1,4-position to the two azo groups, the bond in position 4 leading through the azo bridge to the nucleus F.

TABLE

| Ex. No. | $G_1$ | $G_2$ | $G_3$ | $G_4$ | M | $G_5$ | $G_6$ | $G_7$ | $G_8$ | $G_9$ |
|---|---|---|---|---|---|---|---|---|---|---|
| 6 | -CH$_3$ | NCCH$_2$CH$_2$\N-SO$_2$-/NCCH$_2$CH$_2$ | H | H | 2,5-dimethylphenylene | H | H | -OH | H | H |
| 7 | -OCH$_3$ | Same as above | H | H | 2-methyl-5-methoxyphenylene | H | H | -OH | H | H |
| 8 | -CN | Same as above | H | H | 2,5-diethoxyphenylene | H | -CH$_3$ | -OH | H | H |
| 9 | -Cl | Same as above | -Cl | H | 3,5-dimethylphenylene | H | H | -OH | H | H |
| 10 | -CH$_3$ | Same as above | -CH$_3$ | H | 2-ethoxyphenylene | -OCH$_3$ | H | -OH | H | H |
| 11 | H | Same as above | H | H | 2,5-dimethoxyphenylene | H | H | -OH | H | H |
| 12 | H | H | NCCH$_2$CH$_2$\N-SO$_2$-/NCCH$_2$CH$_2$ | H | do | H | H | -OH | H | H |
| 13 | H | NCCH$_2$CH$_2$\N-SO$_2$-/NCCH$_2$CH$_2$ | H | H | Naphthylene | H | H | -OH | H | H |

TABLE—Continued

| Ex. No. | G1 | G2 | G3 | G4 | M | G5 | G6 | G7 | G8 | G9 |
|---|---|---|---|---|---|---|---|---|---|---|
| 14 | -CH3 | Same as above | H | -Cl | 2,5-dimethylphenylene | H | -CH3 | -OH | H | H |
| 15 | H | Same as above | H | H | 2-ethyl-5-methoxyphenylene | -CH3 | H | -OH | H | H |
| 16 | -NO2 | Same as above | H | H | 2,5-dimethylphenylene | -OH | H | H | -CH3 | H |
| 17 | H | Same as above | H | H | 2-methylphenylene | H | H | -OH | -OCH3 | H |
| 18 | -Br | NCCH2CH2\N-CO-/NCCH2CH2 | H | H | 2,5-dimethylphenylene | H | H | -OH | H | H |
| 19 | -Cl | Same as above | -Cl | H | 2-methoxyphenylene | H | H | -OH | H | H |
| 20 | -CN | Same as above | H | H | 2-methyl-5-methoxyphenylene | H | -OCH3 | -OH | H | H |
| 21 | H | Same as above | H | H | 2-methylphenylene | H | H | -OH | H | H |
| 22 | CH3 | H | NCCH2CH2\N-CO-/NCCH2CH2 | H | 2,5-dimethylphenylene | H | -CH3 | -OH | H | H |
| 23 | -OCH3 | H | Same as above | H | 2-methylphenylene | -OCH3 | H | -OH | H | H |
| 24 | H | NCCH2CH2\N-CO-/NCCH2CH2 | H | H | Naphthylene | H | H | -OH | H | H |
| 25 | -Cl | Same as above | H | H | 2-ethylphenylene | H | -CH3 | -OH | H | H |
| 26 | H | Same as above | H | H | 2,5-dimethylphenylene | -CH3 | H | -OH | H | H |
| 27 | H | Same as above | H | H | 3-methoxyphenylene | -OH | H | H | -CH3 | H |
| 28 | H | Same as above | H | H | 2,5-dimethylphenylene | -OH | H | H | -OC2H5 | H |
| 29 | -CH3 | H3C\N-SO2-/NCCH2CH2 | H | H | 3,5-dimethylphenylene | H | H | -OH | H | H |
| 30 | -Br | Same as above | H | -CH3 | 3-methyl-5-methoxyphenylene | H | H | -OH | H | H |
| 31 | -Cl | Same as above | -Cl | H | 2-methylphenylene | -CH3 | H | -OH | H | H |
| 32 | -CH3 | Same as above | -CH3 | H | do | H | -OCH3 | -OH | H | H |
| 33 | -CN | Same as above | H | H | 2-methyl-5-methoxyphenylene | H | H | -OH | H | H |
| 34 | -NO2 | Same as above | H | H | 2,5-dimethylphenylene | -OH | H | H | -C2H5 | H |
| 35 | H | H | NCCH2CH2\N-SO2-/NCCH2CH2 | H | do | H | H | -OH | H | H |
| 36 | -Cl | H | Same as above | H | 2-methylphenylene | H | H | -OH | H | H |
| 37 | H | -CH3 | Same as above | H | 2-methyl-5-methoxyphenylene | -OH | H | H | -OCH3 | H |
| 38 | H | -CN | Same as above | H | 2,5-dimethylphenylene | H | H | OH | H | H |
| 39 | H | NCCH2CH2\N-SO2-/NCCH2CH2 | H | H | 2-methylphenylene | H | H | OH | H | H |
| 40 | H | Same as above | H | H | 2,5-dimethylphenylene | H | H | OH | H | H |
| 41 | H | Same as above | H | H | 2,5-dimethoxyphenylene | H | H | OH | H | H |
| 42 | H | Same as above | H | H | Naphthylene | -OH | H | H | -CH3 | H |
| 43 | H | Same as above | H | H | 3-methoxyphenylene | -CH3 | H | -OH | H | H |
| 44 | -NO2 | Same as above | H | H | 2,5-dimethylphenylene | -OCH3 | H | -OH | H | H |
| 45 | Cl | H3C\N-CO-/NCCH2CH2 | H | H | 2-acetylphenylene | H | H | -OH | H | H |
| 46 | Cl | Same as above | Cl | H | 3,5-dimethylphenylene | H | H | -OH | H | H |
| 47 | -CN | Same as above | H | H | 2,5-diethylphenylene | -OH | H | H | -OCH3 | H |
| 48 | H | H | H3C\N-CO-/NCCH2CH2 | H | 2-methylphenylene | H | H | -OH | H | H |
| 49 | -CH3 | H | Same as above | H | 2,5-dimethoxyphenylene | H | H | -OH | H | H |
| 50 | -OCH3 | H | Same as above | H | 2-propylphenylene | OH | H | H | -CH3 | H |
| 51 | H | H3C\N-CO-/NCCH2CH2 | H | H | 3-methylmercaptophenylene | H | H | -OH | H | H |
| 52 | H | Same as above | H | H | 2,5-dimethoxyphenylene | H | H | -OH | H | H |

TABLE—Continued

| Ex. No. | G1 | G2 | G3 | G4 | M | G5 | G6 | G7 | G8 | G9 |
|---|---|---|---|---|---|---|---|---|---|---|
| 53 | H | Same as above | H | H | 2-methyl-5-methyl-thiophenylene | H | H | -OH | H | H |
| 54 | H | Same as above | H | H | 2,5-diethoxyphenylene | H | -OCH3 | -OH | H | H |
| 55 | H | Same as above | H | H | Naphthylene | H | H | -OH | H | H |
| 56 | Cl | Same as above | H | H | 2,5-dimethylphenylene | H | -CH3 | -OH | H | H |
| 57 | H | Same as above | H | H | 2-ethyl-5-ethoxyphenylene | -OH | H | H | -CH3 | H |
| 58 | -OC2H5 | Same as above | H | H | 2-methylphenylene | -OH | H | H | -OCH3 | H |
| 59 | -CH3 | NCCH2CH2NHSO2- | H | H | do | H | H | -OH | H | H |
| 60 | -OC2H5 | Same as above | H | H | 2,5-dimethylphenylene | H | -CH3 | -OH | H | H |
| 61 | H | NCCH2CH2NHSO2- | H | H | 2-methyl-5-methoxyphenylene | H | H | -OH | H | H |
| 62 | -NO2 | Same as above | H | H | do | H | H | -OH | H | H |
| 63 | H | NCCH2CH2NHCO- | H | H | 2-butylphenylene | H | H | -OH | H | H |
| 64 | -Cl | Same as above | H | H | 2-methyl-5-methoxyphenylene | H | H | -OH | H | H |
| 65 | -Cl | Same as above | -Cl | H | 2-ethoxyphenylene | H | -OCH3 | -OH | H | H |
| 66 | H | Same as above | H | H | Naphthylene | H | H | -OH | H | H |
| 67 | -CH3 | H | NCCH2CH2NHCO- | H | 3-methoxyphenylene | -OH | H | H | -OC2H5 | H |
| 68 | H | NCCH2NHSO2- | H | H | 2,5-dimethylphenylene | H | -OCH3 | -OH | H | H |
| 69 | H | NCCH2NHCO- | H | H | 2-methyl-5-methoxyphenylene | H | H | -OH | H | H |
| 70 | H | NCCH2CH2CH2NHSO2- | H | H | 2-ethylmercaptophenylene | H | H | -OH | H | H |
| 71 | -Cl | NCCH2CH2CH2NHCO- | H | H | 2,5-dimethylphenylene | -OH | H | H | -CH3 | H |
| 72 | -CH3 | NCCH2CH2(H3C)NSO2- | H | H | 2-methyl-5-methoxyphenylene | H | H | -OH | H | H |
| 73 | H | NCCH2CH2(H3C)N-CO- | H | H | 2-ethyl-5-methoxyphenylene | -OH | H | H | -OCH3 | H |
| 74 | H | NCCH2CH2(CH2CH2)N-SO2- | H | H | 2,5-diethylphenylene | -OCH3 | H | -OH | H | H |
| 75 | -NO2 | NCCH2CH2(H3C-CH(H3C))N-SO2- | H | H | 2-methylphenylene | H | H | -OH | H | H |
| 76 | H | NC-CH2CH2(CH3CH2CH2)N-SO2 | H | H | 2-methyl-5-methoxyphenylene | H | -C2H5 | -OH | H | H |
| 77 | -C2H5 | NCCH2CH2(CH3CH2CH2CH2)N-SO2 | H | H | 2-methylphenylene | H | H | -OH | H | H |
| 78 | H | NCCH2CH2(H3CCH2)N-CO- | H | H | 2-methyl-5-methoxyphenylene | -OH | H | H | CH3 | H |
| 79 | Cl | NCCH2CH2(H3C,H3C-CHCH2)N-CO- | H | H | 3,5-dimethylphenylene | H | H | -OH | H | H |
| 80 | H | CH3-N-CO-NCCH2CH2 | H | H | 2-(2'-methyl)-propylphenylene | H | H | -OH | H | H |
| 81 | H | NCCH2CH2NH-SO2 | H | H | 2-methyl-5-methoxyphenylene | H | H | -OH | H | H |
| 82 | H | NCCH2CH2NH-CO- | H | H | 2,5-dimethoxyphenylene | H | H | -OH | H | H |
| 83 | H | NCCH2CH2(NCCH2CH2)N-CO- | H | H | 2-methylphenylene | H | H | -OH | H | H |
| 84 | H | Same as above | H | H | 2,5-dimethylphenylene | H | H | -OH | H | H |
| 85 | H | NCCH2CH2(H3C)N-CO- | H | H | 2-methylphenylene | H | H | -OH | H | H |
| 86 | H | Same as above | H | H | 2,5-dimethylphenylene | H | H | -OH | H | H |

3,496,162

TABLE—Continued

| Ex. No. | G₁ | G₂ | G₃ | G₄ | M | G₅ | G₆ | G₇ | G₈ | G₉ |
|---|---|---|---|---|---|---|---|---|---|---|
| 87 | H | Same as above | H | H | 2-methyl-5-methoxyphenylene | H | H | -OH | H | H |
| 88 | H | NCCH₂CH₂\N-SO₂-  / H₃C | H | H | 2-methylenphenylene | H | H | -OH | H | H |
| 89 | H | Same as above | H | H | 2,5-dimethylphenylene | H | H | -OH | H | H |
| 90 | H | H | NCCH₂CH₂\N-SO₂- /NCCH₂CH₂ | H | ...do... | H | H | -OH | H | H |
| 91 | H | H | NCCH₂CH₂\N-SO₂ /H₃C | H | 2-methyl-5-methoxyphenylene | H | | -OH | H | H |
| 92 | H | H | NCCH₂CH₂\N-CO- /NCCH₂CH₂ | H | 2-methylphenylene | H | H | -OH | H | H |
| 93 | H | H | NCCH₂CH₂\N-CO- /H₃C | H | 2-methyl-5-methoxyphenylene | H | H | -OH | H | H |
| 94 | H | NCCH₂\N-SO₂- /CH₃CH₂ | H | H | ...do... | H | H | -OH | H | H |
| 95 | H | NCCH₂CH₂\N-CO /CH₃CH₂ | H | H | 2,5-dimethylphenylene | H | H | -OH | H | H |
| 96 | H | -OH | NCCH₂CH₂\N-CO- /H₃C | H | 2-methoxyphenylene | H | H | -NO₂ | H | |
| 97 | H | -OH | Same as above | H | 2,5-dimethylphenylene | -Cl | H | -NO₂ | H | H |
| 98 | H | -OH | Same as above | H | 2-methoxy-5-ethylphenylene | -NO₂ | H | -NO₂ | H | H |
| 99 | H | -OH | NCCH₂CH₂\N-CO- /H₃CCH₂ | H | 3-ethylphenylene | -Cl | H | -NO₂ | H | Cl |
| 100 | H | -OH | NCCH₂CH₂\N-CO- /H₃CCH₂CH₂ | H | 3-methoxyphenylene | -CN | H | -NO₂ | H | H |
| 101 | H | -OH | NCCH₂CH₂\N-CO- /NCCH₂CH₂ | H | 2-methoxyphenylene | H | H | -NO₂ | H | H |
| 102 | H | -OH | Same as above | H | 2,5-dimethylphenylene | -SO₂CH₃ | H | -NO₂ | H | H |
| 103 | H | -OH | Same as above | H | Naphthylene | H | H | H | H | H |

104

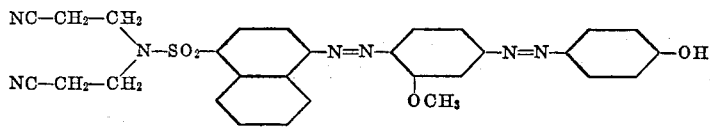

105

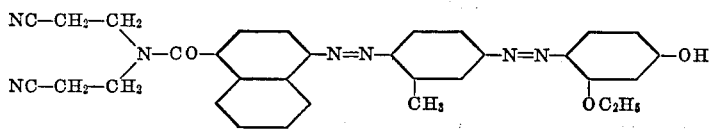

106
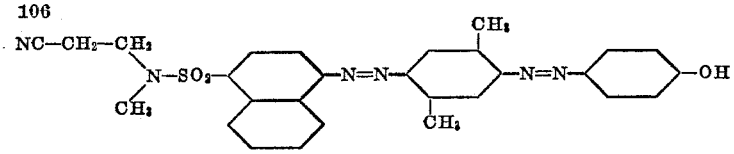

107
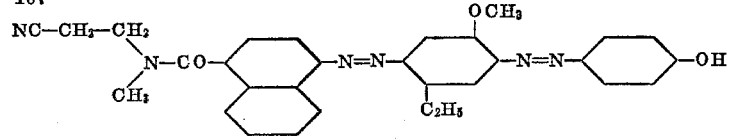

DYEING EXAMPLE 1

A mixture of 7 parts of the dye obtained as described in Example 5, 4 parts of sodium dinapthylmethane disulphonate, 4 parts of sodium cetyl sulphate and 5 parts anhydrous sodium sulphate is ground in a ball mill for 48 hours to a fine powder. One part of the powder is dispersed in 3000 parts of water containing 3 parts of a 30% solution of a highly sulphonated castor oil and 20 parts of an emulsion of a chlorinated benzene. Into this bath 100 parts of a fabric of polyester fibre are entered at 20–25°, and in about 30 minutes its temperature is increased to 95–100°. The fabric is dyed for 1 hour at the latter temperature, then removed from the bath, rinsed, soaped for 15 minutes at 70° with a 0.1% solution of an alkylphenylpolyglycolether, rinsed again and dried. A yellow-brown dyeing with excellent fastness properties is obtained.

DYEING EXAMPLE 2

A mixture of 38 parts of the dye obtained according to Example 4, 40 parts of sodium dinaphthylmethandisulphonate, 50 parts of sodium cetyl sulphate and 50 parts of anhydrous sodium sulphate is ground in a ball mill for 48 hours to a fine powder. 2 parts of this powder are dispersed in 1000 parts of water at 40–50°. 100 parts of a scoured fabric of "Terylene" (registered trademark) polyester fibre are entered into the bath, the temperature is increased slowly to 130° and the fabric dyed for about 1 hour at this temperature under pressure. Subsequently it is rinsed, soaped, rinsed and dried. A yellow dyeing with very good fastness properties is obtained.

Examples of representative dyes of the foregoing examples are as follows:

Example 1
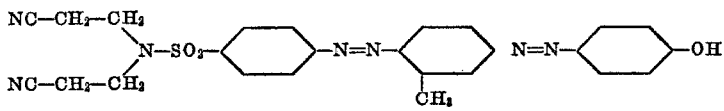

Example 2
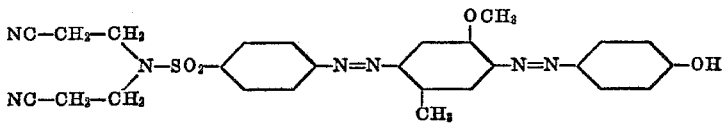

Example 3
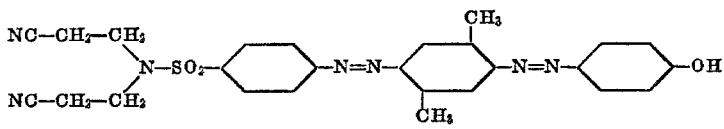

Example 4
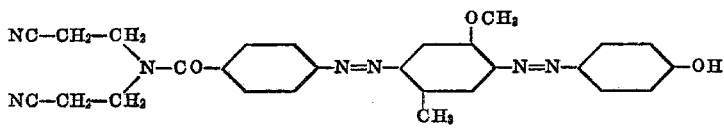

Example 5
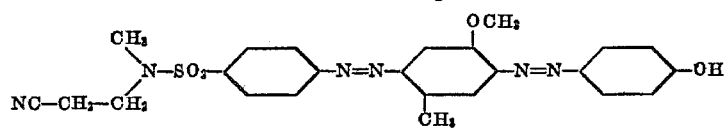

Having thus disclosed the invention what we claim is:
1. Disazo dye of the formula

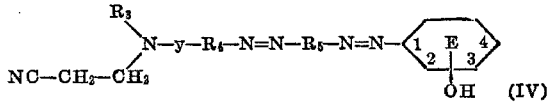

wherein $R_3$ is a member selected from the group consisting of hydrogen, lower alkyl and cyano(lower)alkyl;

R₄ is a member selected from the group consisting of (a) phenylene, (b) naphthylene and (c) phenylene or naphthylene substituted by at least one substituent each of said substituents being a member selected from the group consisting of chloro, bromo, nitro, cyano, lower alkyl and lower alkoxy;

R₅ is a member selected from the group consisting of (a) phenylene, (b) naphthylene and (c) phenylene or naphthylene substituted by at least one substituent each of said substituents being a member selected from the group consisting of lower alkyl, lower alkoxy and lower alkylmercapto; and y is a member selected from the group consisting of —CO— and —SO₂—;

and wherein the HO— group in nucleus E is in one of the 2- and 4-positions; said nucleus E either being otherwise unsubstituted or being substituted by a member selected from the group consisting of lower alkyl, lower alkoxy, chloro and bromo.

2. Disazo dye according to claim 1 of the formula

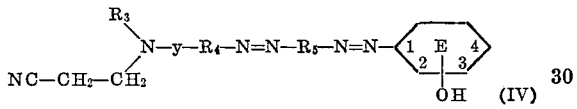

wherein

R₃ is a member selected from the group consisting of hydrogen, lower alkyl and cyano(lower)alkyl;

R₄ is a member selected from the group consisting of (a) phenylene, (b) naphthylene, (c) phenylene substituted by a member selected from chloro, bromo, nitro, cyano, lower alkyl and lower alkoxy and (d) naphthylene substituted by a member selected from the group consisting of chloro, bromo, nitro, cyano, lower alkyl and lower alkoxy;

R₅ is a member selected from the group consisting of (a) phenylene, (b) naphthylene, (c) phenylene substituted by at least one substituent each of said substituents being a member selected from the group consisting of lower alkyl, lower alkylmercapto and lower alkoxy and (d) naphthylene substituted by at least one substituent each of said substituents being a member selected from the group consisting of lower alkyl, lower alkylmercapto and lower alkoxy;

y is a member selected from the group consisting of —CO— and —SO₂—;

and wherein the HO— group in nucleus E is in the 2- or 4-position, said nucleus E either being otherwise unsubstituted or being substituted by a member selected from the group consisting of lower alkyl and lower alkoxy.

3. Disazo dye according to claim 1 of the formula

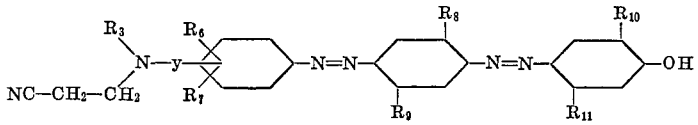

wherein

R₃ is a member selected from the group consisting of hydrogen, lower alkyl and cyano(lower)alkyl;

each of R₆ and R₁₀ is, independently, a member selected from the group consisting of hydrogen, chloro, bromo, lower alkyl and lower alkoxy;

R₇ is a member selected from the group consisting of hydrogen, chloro, bromo, nitro, lower alkyl and lower alkoxy;

each of R₈ and R₉ is, independently, a member selected from the group consisting of hydrogen, lower alkyl, lower alkoxy and lower alkylmercapto;

R₁₁ is a member selected from the group consisting of lower alkyl and lower alkoxy; and y is a member selected from the group consisting of —CO— and —SO₂—.

4. Disazo dye according to claim 3 of the formula

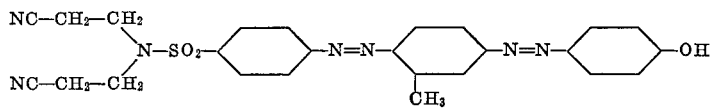

5. Disazo dye according to claim 3 of the formula

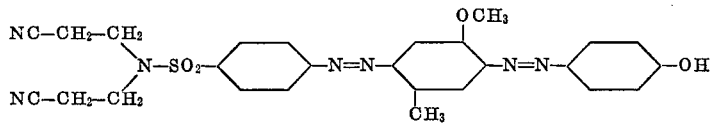

6. Disazo dye according to claim 3 of the formula

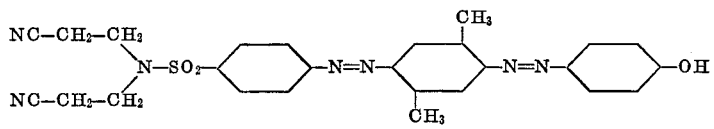

7. Disazo dye according to claim 3 of the formula

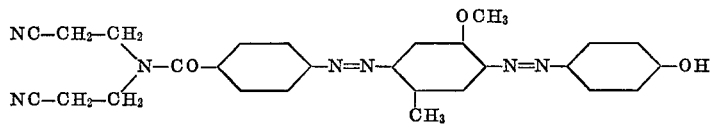

8. Disazo dye according to claim 3 of the formula

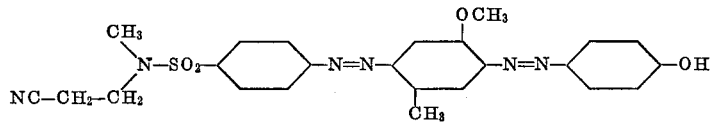

(References on following page)

References Cited

UNITED STATES PATENTS 3,153,642  10/1964  Ziegler et al. _____ 260—191 XR

FOREIGN PATENTS 1,409,796  8/1965  France.

FLOYD D. HIGEL, Primary Examiner

U.S. Cl. X.R.

8—41, 50, 63, 71; 260—186, 190, 191, 205, 206, 207, 207.1, 208, 465, 556